United States Patent [19]

Kuhme

[11] Patent Number: 5,362,393
[45] Date of Patent: Nov. 8, 1994

[54] PRESSURE FILTER FOR LIQUIDS

[75] Inventor: Ernst Kuhme, Bochum, Germany

[73] Assignee: Karl Brieden Bau-Und Beteiligungs-KG, Germany

[21] Appl. No.: 33,312

[22] Filed: Mar. 15, 1993

[30] Foreign Application Priority Data

Feb. 10, 1992 [DE] Germany ............................ 4303847
Mar. 13, 1992 [DE] Germany ........................ 9203382[U]
May 28, 1992 [DE] Germany ............................ 4217666

[51] Int. Cl.$^5$ ............................................. B01D 33/25
[52] U.S. Cl. ................................ 210/333.01; 210/331; 210/346; 210/404; 210/486; 55/430; 55/432
[58] Field of Search ................ 210/150, 151, 324, 326, 210/330, 321, 333.01, 333.1, 402, 404, 408, 346, 486; 55/430, 432

[56] References Cited

U.S. PATENT DOCUMENTS 4,251,376  2/1981  Badino .................................. 210/331
4,293,411  9/1981  Davis ................................... 210/331
4,889,623 12/1989  Nilsson .......................... 210/333.01

Primary Examiner—Frank Spear
Assistant Examiner—David Reifsnyder
Attorney, Agent, or Firm—Kinney & Lange

[57] ABSTRACT

A pressure filter includes a pressure vessel having a pressure chamber and a circumferential edge; a turntable rotatably mounted within the pressure vessel about a horizontal axis; a plurality of filters non-rotatably mounted to the turntable and spaced apart from each other at the circumferential edge of the pressure vessel and rotatable around the horizontal axis through a center of the pressure vessel such that the plurality of the filters continuously dip into and out of a solid solution in a bottom of the pressure chamber. A blow-off station is positioned above the solid suspension in the pressure chamber for freeing filter cake that has dried on the plurality of filters. A filter cake conveyor conveys the blown-off filter cake through a pressure lock in the pressure vessel. Each filter forms a filter element having a filter surface which is defined by cross-section sides extending along a radius of the pressure vessel adjacent to the circumferential edge, and long sides extending parallel to the horizontal axis of pressure vessel.

13 Claims, 7 Drawing Sheets

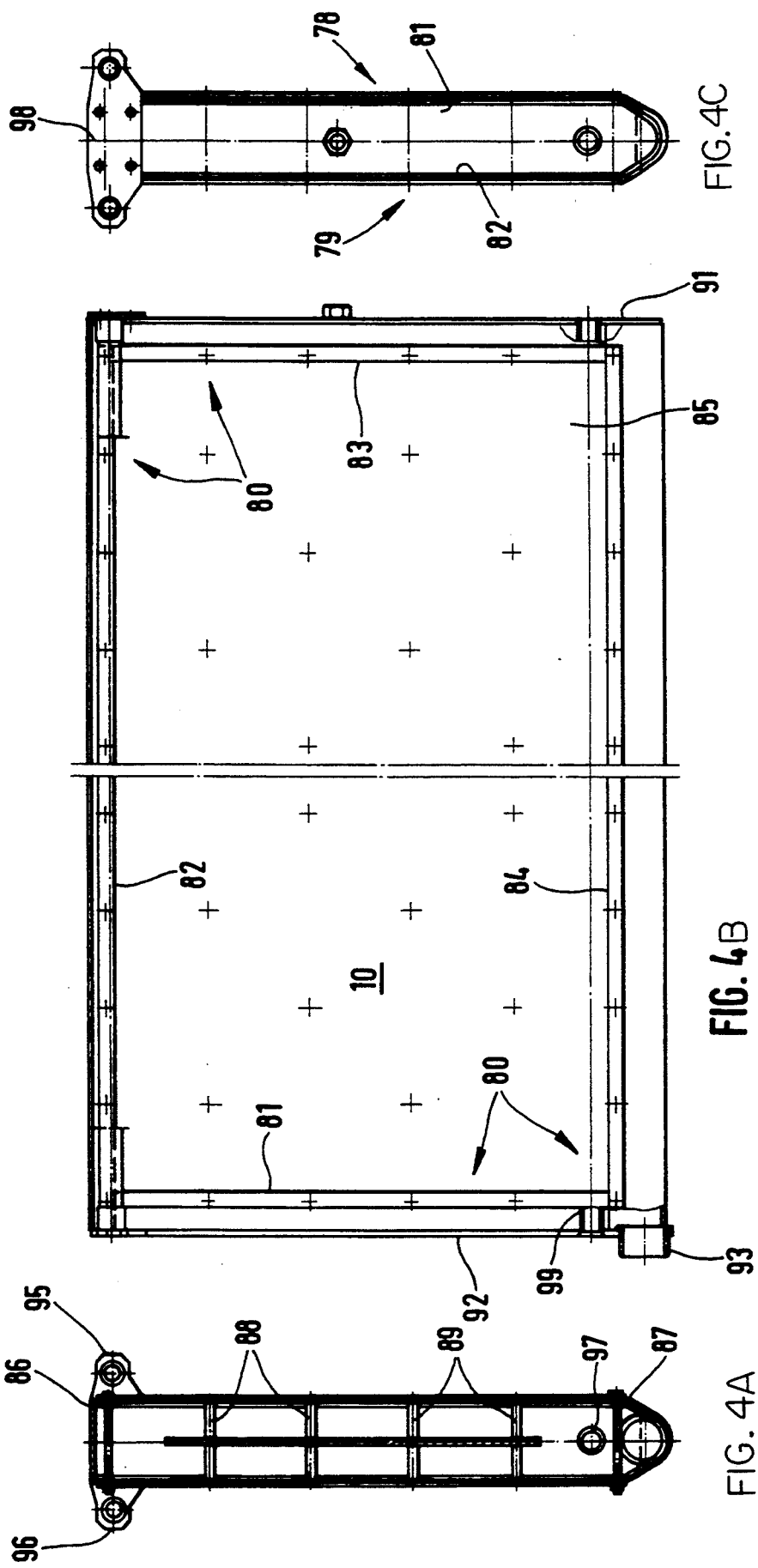

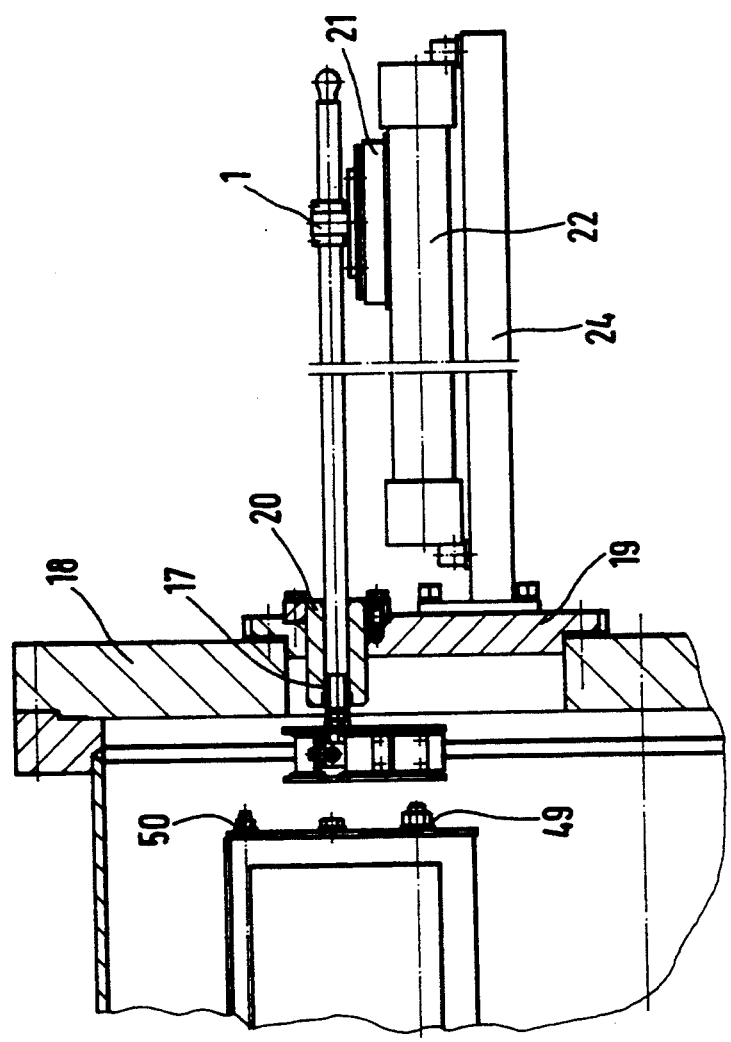
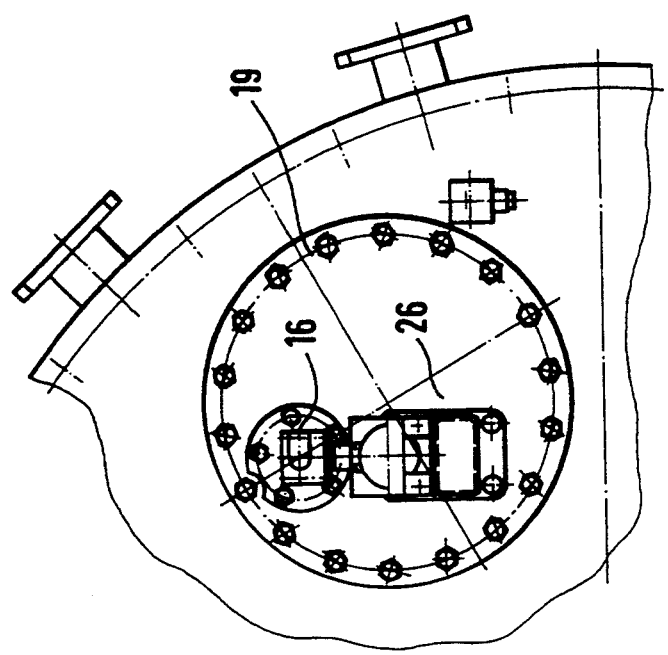
FIG. 7B
FIG. 7A

PRESSURE FILTER FOR LIQUIDS

BACKGROUND OF THE INVENTION

The invention pertains to a pressure filter for liquids.

In particular, the invention pertains to a pressure filter for liquids that among others is utilized for technical liquids to separate a solid phase from a liquid phase. This may involve the treatment of process water for the purpose of water purification. The required high throughput volume is, with the pressure filter according to, the invention essentially based on the positive pressure maintained in the pressure vessel, thereby raising the pressure differential in the filters. This causes rapid growth of the filter cake formed by the solid phase of the solids suspension in the filter medium, as soon as liquid flows through the affected filter from the outside in.

The comparatively high throughput of such liquid filters is based on continuous filtration. It follows from this that the filter elements, which are moved stepwise in the pressure vessel during the rotation along a circular path, are in the blow-off station individually freed of the filter cake adhering to its filter medium, while the other filter elements continue the filtration or are being prepared for filtration. Another advantage of such pressure filters for liquids is that the filter cake is obtained relatively dry, since the drying process starts after the emergence of the filter elements and continues until the throw-off of the filter cake. This simplifies the further treatment of the filter cake substantially. Therefore, such filter cakes are also suited for the severely contaminated liquids with difficult to dewater filter cakes.

These and other advantages of the pressure filter according to the invention can be achieved with a control that regulates the filtration process steps resulting from the functionality of the pressure filter. The stepwise controllable rotational motion of the filter elements lets these dip individually into the solids suspension and move through the liquid to be filtered, until they finally emerge again and reach the dry sphere above the surface of the liquid. The pressure differential in the filters is maintained here and pushes in this way further liquid through the filter cake as filtrate that is discharged from the filter. The removal of the finally dried filter cake from the surface of the filter medium of each filter cartridge (filter element) occurs by a blast of air that reverses the pressure differential in the filter as and such throws off the filter cake from the filter medium. The filter cake falls onto a filter cake transporting device which, e.g., consists of a chain conveyor and is discharged through a pressure lock, so that the working pressure in the pressure filter does not have to be lowered.

Pressure filters of this type are known in principle and have so far been applied for the filtration of coal slurries (ref. periodical "Aufbereitungstechnik" 27, 1986, pp 387/395). In these, the filters consist in each case of a multitude of disk-like filter elements arranged on a common axis around which the filter elements rotate in a pressure housing, together and counter to the rotational motion of the filter. Although the mechanical requirements for filters of such design are comparatively high, in spite of the disk form of the filter elements, the filter area in total cannot be increased at will. This is so, because on one hand, depending on the individual case, the thickness of the filter cake reaching the blow-off station predetermines the axial distance of the filter elements that in the blow-off stations must still be sufficiently large to assure a successful blow-off. On the other hand, however, the disk diameter cannot be increased at will, since it determines the number of the filters to be housed in the pressure housing and therewith the number of the filtration processes during one revolution of the filter. Generally speaking, the disk form of the filter creates the difficulty in pushing the filter cake off without leaving a residue, since the gaps between the filter elements must naturally be chosen as small as possible.

SUMMARY OF THE INVENTION

According to the invention, the filter surfaces of the filter elements are arranged parallel to the axis of rotation of the pressure vessel. The axis-parallel arrangement of the filter surfaces makes their size independent of their radial distance from the filter axis. With that, the number of the rotating filters and, therefore, the number of the filtration processes during one revolution of the filter in the pressure vessel can be increased, and in this way an optimal size of the filter is surface achieved for a given diameter of the pressure vessel. Because the radial diameter of the filter decreases this way, the invention no longer requires the movement of the filter elements around its axis for the complete coverage of the filter surface with the filter cake. For this reason, the filter elements according to the invention are supported in fixed positions, i.e. they do not rotate around their own axis. This leads to a substantial simplification of the mechanical design and control of such pressure filters.

A substantial advantage of the pressure filter according to the invention consists also in that, other than in the disk filters, the filter surfaces of the filter elements after their emergence from the solids suspension are always at least in part positioned more or less horizontally, and not as is known vertically, and turn only in the blow-off station through their revolution into the vertical or a nearly vertical position. This acts against the dropping of the filter cake prior to the blow-off station which, depending on the material characteristics of the solids suspension, may lead to substantial parts of the filter cake falling back into the solids suspension before the affected filter has reached the blow-off station.

The pressure filter according to the invention is, therefore, not only suited for the generation of a further usable filtrate, but also for filtration goals that are aimed at treating the filter cake still prior to the blow-off station. An example for this is the recovery of the residual sugar from carbonate slurry in sugar production. Through the application of a pressure filter according to the invention, it is possible to extract the residual sugar from the filter cake by a spray wash and to discharge it with the filtrate.

In one embodiment of the invention the filter elements contain a box-like hollow body which supports a stretch-mounted, flexible, partly hollow-lying filter medium. Since the solid part of the filter element, due to its box-like form has a high stiffness of form here, it can be used in a simple manner for the non-rotating support of the filter on a turntable that stands nearly vertically in its plane, due to the lying arrangement of the pressure vessel. Simultaneously, axial mantle surfaces are created hereby on which the filtration occurs with the partially supported filter cloth. These mantle surfaces are, therefore, perforated to lead the filtrate into the inside of the box, from where it is discharged. When such a filter element arrives at the blow-off station, the support of the filter medium may furthermore be chosen such that it partly lifts off the mantle surfaces of the box and through this deformation assists the removal of the filter cake.

The filter elements require a continuous monitoring and repair of unavoidable damage that in operation occurs primarily on the filter medium, especially in very demanding filtration. While such jobs on the known pressure filters, due to their described design, can only be done during longer interruptions of the filtration, the arrangement of the filter surfaces according to the invention, and the non-rotating support of the filter elements, make it possible to execute such jobs in a very short time. In one embodiment the pressure vessel has a wall arranged across from the turn table and an opening for the filter elements, when the filter elements are fastened to the turn table with the stud bolts and positioned adjacent to a pipe socket that handles the discharge of the filtrate. The arrangement is here such that, after loosening the nuts or the studs, the entire filter element together with its pipe socket may be pulled off and remounted in reverse fashion. In this way, e.g., filter cloths, which are the primary choice of filter medium, may be exchanged in a simple manner.

This exchange of the filter medium or the new covering of the filter elements is also simplified by the invention compared with the known pressure filters. The known disk form of the filter elements makes a respectively manufactured filter medium, especially filter cloth, necessary for the pressure filter according to the invention one may cut off from a filter medium supply the length required in each case for a covering of a filter element and cover the axial filter surfaces of the filter with it.

The premature dropping of the filter cake from the filter surfaces prior to the blow-off station may be countered by special measures according to the invention. A possible form of execution of such pressure filters results from the filter elements each containing a pair of hollow bodies connected by a common filtrate discharge and each filter element having filter surfaces where the filter surfaces have a rectangular contour and a leading hollow body of each pair of hollow bodies is tilted forward, in the direction of rotation of the turntable, toward a radius of the turntable, while a trailing hollow body of each pair of hollow bodies is positioned with a radial main plane in the radius of the turntable. Accordingly, the filter surfaces of the two hollow bodies, that in pairs constitute one filter element, essentially lie horizontally at the time of emergence of the filter element from the solids suspension, and without mechanical effort are only by the circular motion individually turned in the blow-off station into the nearly vertical position. This allows the filter cake to reach a substantial thickness on the filter surfaces, without that it comes to losses of the solids during the rotary motion and especially during the emergence of the filter elements. This is due to achieving a nearly horizontal filter surface for each of the two hollow bodies at the point of emergence of the filter element from the solids suspension.

Another suitable form of the filter elements include a contour line of each cross-section of the filters converging in the direction of the center of rotation of the turn table, wherein the contour line has converging partial sections which form an apex, wherein the filtrate removal is situated into the apex of the converging partial sections, wherein the converging partial sections are each connected by an arch that partially encloses the filtrate discharge, and wherein ends of the converging partial sections face away from the turn table and are connected with each other. Here, the contour line of the cross section of the filter element is changed such that it deviates from the circular cross section. At the same time, the filter elements are arranged such that the contour line of their cross section converges in direction toward the center of the rotational motion of the filters in the pressure vessel; therefore, as soon as the filter elements emerge, the filtrate runs downwards into the respective filtrate discharge. Since furthermore the filtrate discharge is arranged eccentrically in the direction of the center of rotation, a downward slope is created practically for the entire filter cake which directs the liquid in the filter elements in the direction of the lowest point of the filter element cross section and hence into the discharge, as soon as the filter elements are standing above the liquid level in the pressure vessel. The filtrate present in these filter elements can be virtually completely pressed out, thereby enhancing the filter output and the drying of the filter cake.

Incidentally, it was surprisingly established that the change from the known disk form of the filter surface to the hollow prism form according to the invention does not, or at least not substantially, reduce the filter surface. This is partly due to the possibility to arrange a comparatively denser configuration of the filter elements on a partial circle around the center of rotation and thereby increase the number of the filter elements. Also the difficulties with the complete removal of the filter cake caused by the wedge construction of the disk filters, described above, do not occur here.

Therefore, the invention is preferentially realized with the above structure. The near circle-sector-like form of the filter element cross section allows an optimally dense configuration of the filters on the selected partial circle around the center of rotation of the turntable and assures also by the arrangement of the filtrate discharge a complete removal of the filtrate from the filter elements.

The cross section of the filter elements may be in the form of a roof-like slope. The herein provided roof-like incline has a beneficiary effect on the withdrawal of the filtrate from the filter element, because it favors the run-off of the liquid. The alternative described in this section has the comparative advantage of a simpler design and, through the straight line of the filter element cross section appearing geometrically as secant on a partial circle around the center of rotation, the advantage that the pressure housing may be made smaller in its radial dimension.

The filter output of the pressure filter according to the invention may under certain conditions be substantially increased, if the filter medium, after blowing off the filter cake, can be prepared in a suitable manner for the subsequent filtration cycle. This purpose is served by the pressure filter further comprising a rinse station for rinsing a filter medium, the rinse station being located downstream of the blow-off station between adjacent filters, and wherein the rinse station has a pipe lance having a discharge nozzle for the rinse medium and a drive that guides the pipe lance along the filter surface of adjacent filter elements; The rinse medium brought here onto the surface of the filter medium may be selected according to the demands of the individual case. In general, the first goal is the removal of adhering residual filter cake from the filter medium. In these cases, one will preferentially use a pressurized liquid with which the filter medium surface is treated by running, during the stoppage of the rotational movement, once or several times along the axial length of the filter cake to conduct a high pressure wash.

Following the washing of the filter medium described above, one may also arrange for a pre-coating. The pre-coating reduces the adherence of the filter cake or the special components of the solids on the filter medium so that, as a result, the filters are completely cleaned off on reinsertion into the liquid. Primarily considered for the pre-coating are materials added to water, and compounds suited for the particularly persistent filter cake components. They render the filter medium repellant against them. Proven in this connection are Fuller's earth, bituminous coal dust or the like.

The increase of the filter elements made possible by the invention, and the optimization achieved by the form and arrangement of the filter surfaces in the pressure filter, allows also as further preparation of the filters for a filtration cycle a pre-forming of the filter medium before the filtrate is withdrawn, with the goal of building up a certain filter cake thickness. This occurs after the submersion of the filter elements in the solids suspension. In this, a pre-filtrate is separately removed under monitoring or measuring of the turbidity of the filtrate, until the filtrate purity is satisfactory. These measures of the invention are intended for individual cases in which special requirements must be met regarding the purity of the filtrate.

BRIEF DESCRIPTION OF THE DRAWINGS

The details, further characteristics and other advantages of the invention result from the following description of the forms of execution on hand of the figures in the drawing; it shows.

DETAILED DESCRIPTION OF THE PREFERRED EMBODIMENTS

Figure 1:
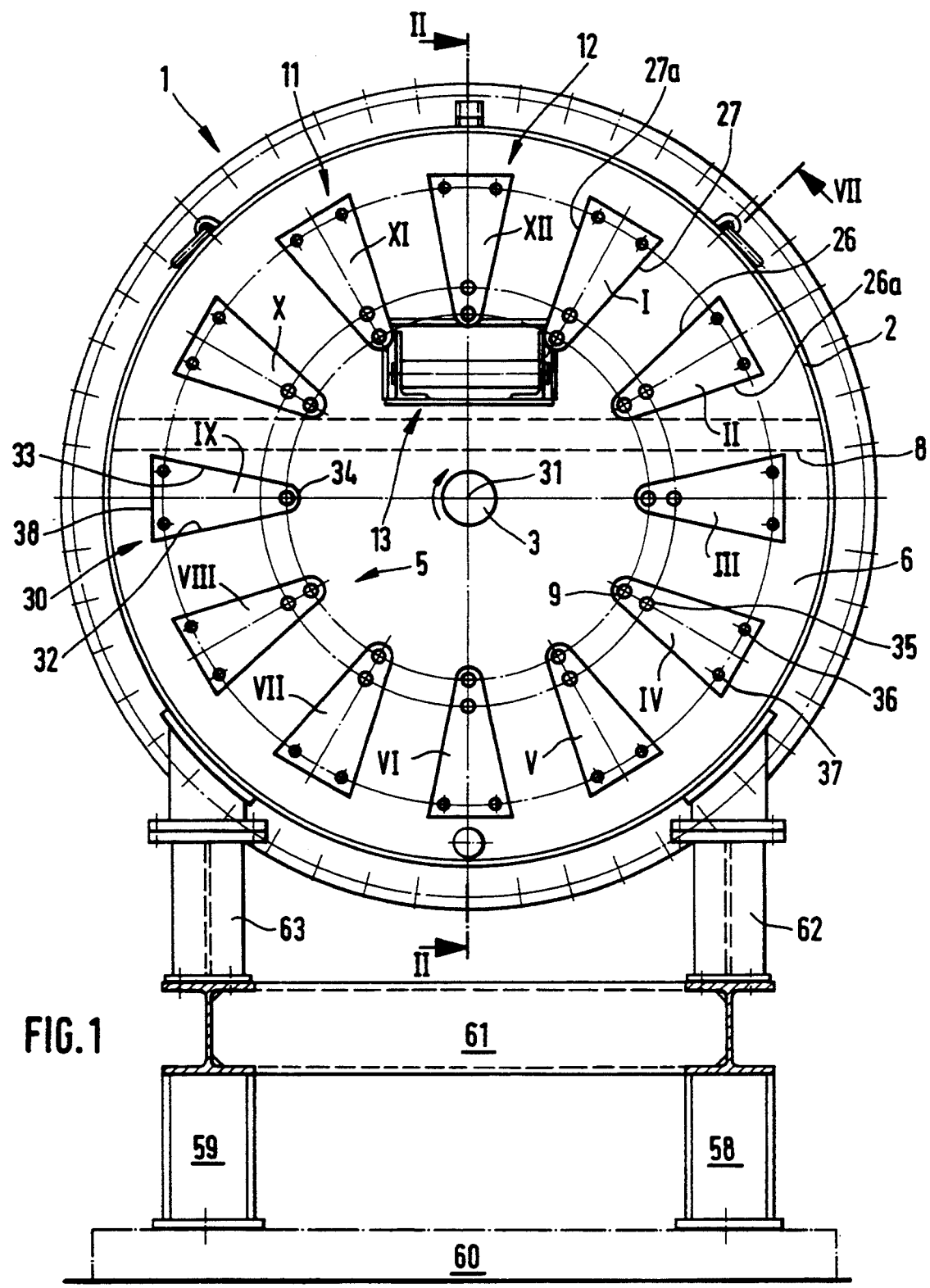
FIG. 1 a schematic cross section through a pressure filter according to a first form of execution, FIG. 2 a section along the line FIG. II—II of FIG. 1, and FIG. 3 in the depiction according to FIG. 1 a further form of execution of a pressure filter, FIG. 4 a filter element in several depictions, FIG. 5 an individual unit of the pressure filter according to FIG. 1 in several depictions, FIG. 6 the object of FIG. 1 in top view, and FIG. 7 on the right a section along the line VII of FIG. 1 and on the left a frontal view of the object shown on the right.

The pressure filter generally labelled 1 in FIG. 1 is, according to the depicted example of execution, intended for the separation of a solid material from a solids suspension that constitutes a liquid to be filtered. The liquid is process water.

A hollow cylindrical pressure vessel 2 is arranged in a lying position, and a turntable 4 is rigidly fastened on a shaft 3 rotating in a direction of the arrow in FIG. 1. According to the example of execution, the shaft can be shifted in steps of 30° each. On partial circles around the center 31 of the shaft 3 on the turntable 4, the hollow prismatic filter elements 5, labeled with the position numbers I to XII, are fastened in equal intervals, i.e. offset by 30°. The inside 6 of the pressure vessel 2 is under positive pressure. The positive pressure amounts, e.g., to 4 bar. The lower part of the pressure vessel contains the suspension. Its liquid level 8 is held at a predetermined height in the pressure vessel. By the stepwise rotation of the shaft 3, the filters I-XII arrive in clockwise direction one after the other in the solids suspension 7 and emerge again from it. In the example of execution the filters with the position numbers X to II stand above the level 8. The remaining filters are submerged in the suspension. Each filter contains an axial discharge pipe 9 with which the filtrate is removed from the inside of the filter element.

Figure 3:
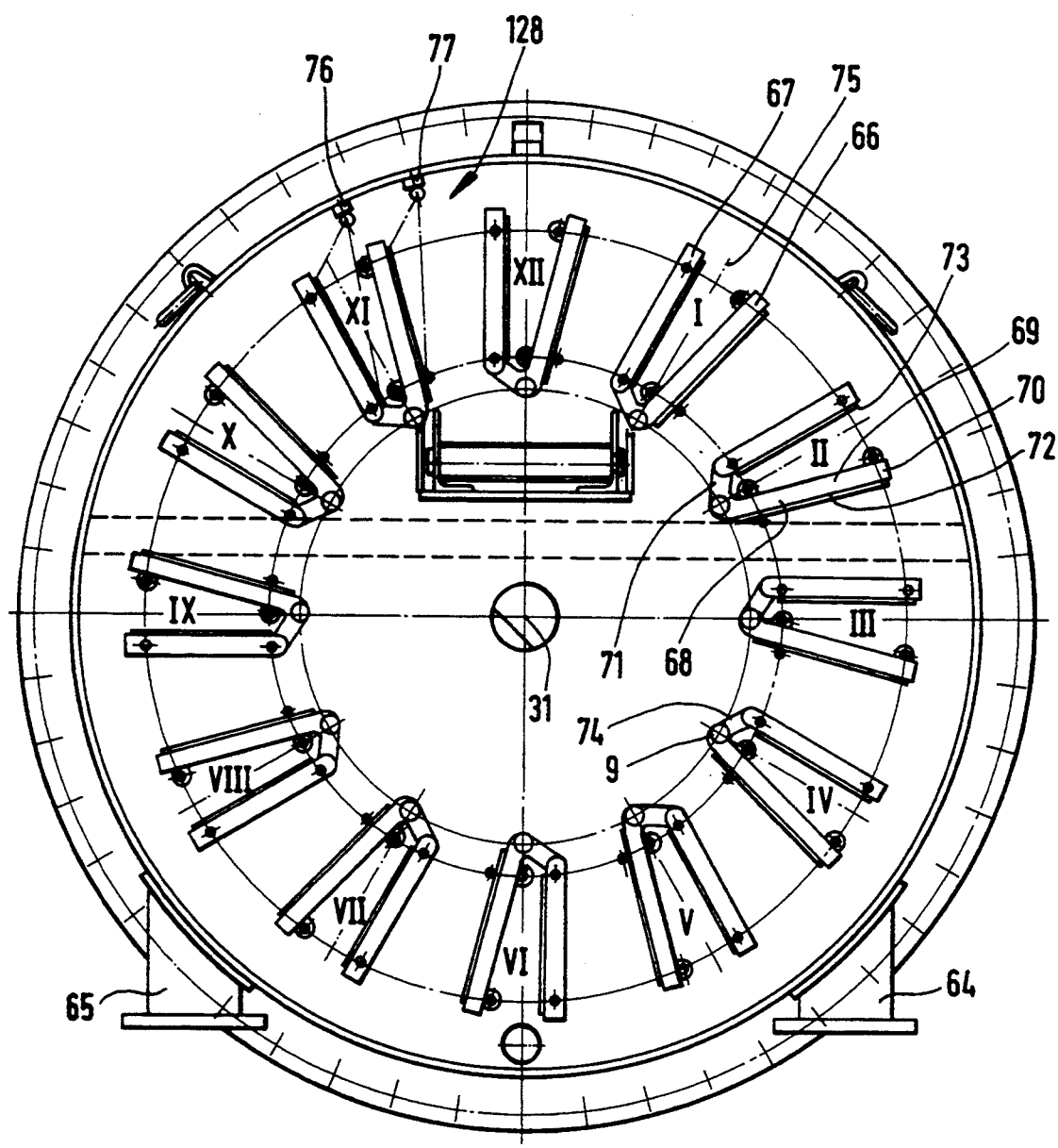

At the operational condition depicted in FIG. 1 and 3, filtrate is continuously removed from the filter elements with the position numbers III to IX. The filter element with the position numbers X has emerged from the suspension. The removal of the filtrate is continued in it, whereby the filter cake is dried on the filter medium 10 (FIG. 4). This drying process is continued in the trailing station 11 at which the filter with the position number XI is positioned. At the subsequent blow-off station 12, where the filter XII is located, the filter cake is pushed off. This is accomplished by an externally created pneumatic positive pressure with which the filter cake is blown off and carried out on a conveyor belt 13 situated underneath it. The conveyor belt 13 of the filter cake conveyor transports the filter cake from the inside room of the pressure vessel through a pressure lock with swivel flaps 52 and 53.

Figure 6:
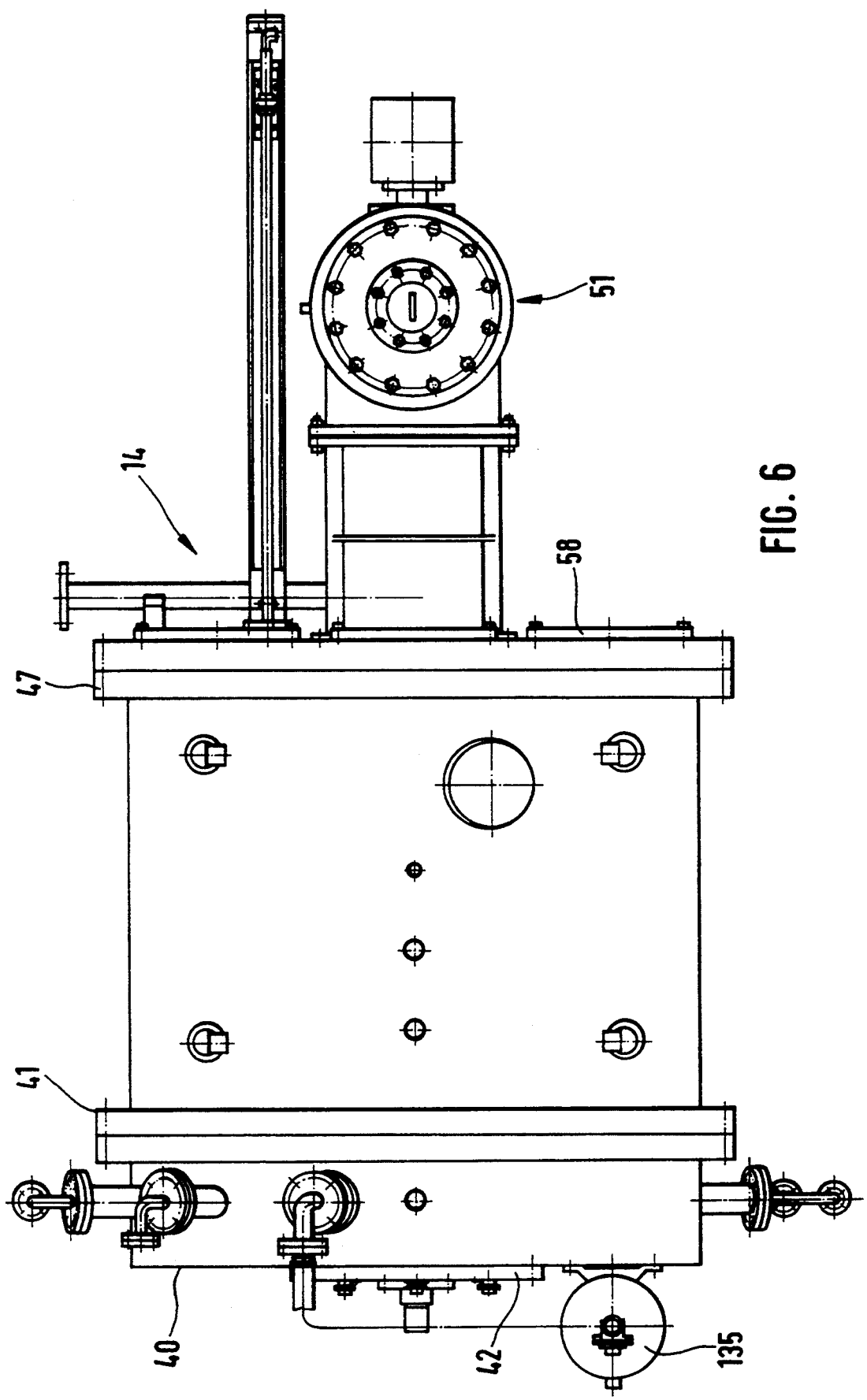

In the section above the solids suspension level 8 in pressure housing 2 there is, in the direction of rotation after the filter cake blow-off station, a high-pressure cleaning station 14 (FIG. 6) installed in which, e.g., the filter medium is treated with filtrate and thereby freed of filter cake residues. The arrangement is here such that the action of the rinse medium between two adjacent filter elements always occurs on the trailing side 26 of the leading filter element II and on the leading side 27 of the trailing filter I. With that, both sides 26 and 26a, or 27 and 27a, of all filter elements subjected to a high-pressure wash are during two successive partial revolutions of the turntable 4.

According to the depicted example of execution, an axially movable high-pressure rinse lance 15, with an axial drive 16, is for this process located behind the blow-off station between filter II and filter I, offset by an angle at a circumference corresponding to the cycle sequence of the turntable. The frontal side of the lance pipe directed into the pressure chamber 2, that penetrates the back wall 18 through a gasket 17 of the pressure vessel 2, carries a nozzle head 16 that points toward the adjacent filter surfaces of the filter elements I and II. A sleeve 20 is positioned in a housing cover 19 of the container 2, in an opening corresponding to the circumference of the sleeve. The lance runs through it to the outside. The outside end of the lance sits in a sleeve 16 that with its bottom 21 is connected to a double-action drive cylinder 22. This cylinder has, in order to avoid a special hydraulic system and to utilize the mandatory pneumatic system, preferentially a pneumatically driven piston and is located on a console 24 that is connected to the cover 18. The lance, in dependency on the cycle sequence of the turntable, is guided into the gap between two adjacent filters—in the example of execution with the position numbers I and II—so that the action of the liquid exiting from the flat-stream nozzle 14 on the filter medium is assured. When the drive has pulled the lance back, the advancing rotation of the turntable 4, and of the filters I to XII sitting on it, is triggered.

Through the same lance a pre-coating liquid may also be fed into the pressure chamber onto the filter medium (e.g., an aqueous slurry of bituminous coal).

The filters I to XII each constitute one filter element. They can be realized in special form with the position numbers I to XII in the oblong hollow form depicted in FIG. 1. The filter cross section of the effective filter surface is here equal in all cross sections and provided with a contour line 30 which in direction of the center of rotation 31 of the turntable 4 has converging path lengths labeled 32 and 33 in FIG. 1. The filtrate discharge from the filter through the pipe 9 is located underneath the apex of the converging contour lines 32, 33. Since the filters I to XII are arranged on the turntable 4 such that the apexes of their contour sections 32, 33 are lying inside, i.e., on radii of the center of rotation 31, the filtrate runs within the emerged filters—in the example of execution the filters with the position numbers X to II —downward over a slope toward the discharge pipe 9. In the apex of the cross section, the sections 32, 33 are connected with a curved, i.e. arcing contour line of a section 34. On the opposite side, the converging contour sections 32, 33 are rectilinear at 38. They may also be connected with a roof-like double slope formed like a hip roof. From this derives the possibility to fasten the filters optimally on the turntable 4. This is done with three studs 35 to 37. Two of the three studs with the position numbers 36 and 37 are then located below the slope. The third stud is positioned next to the discharge pipe 9 inside the filter.

Figure 2:
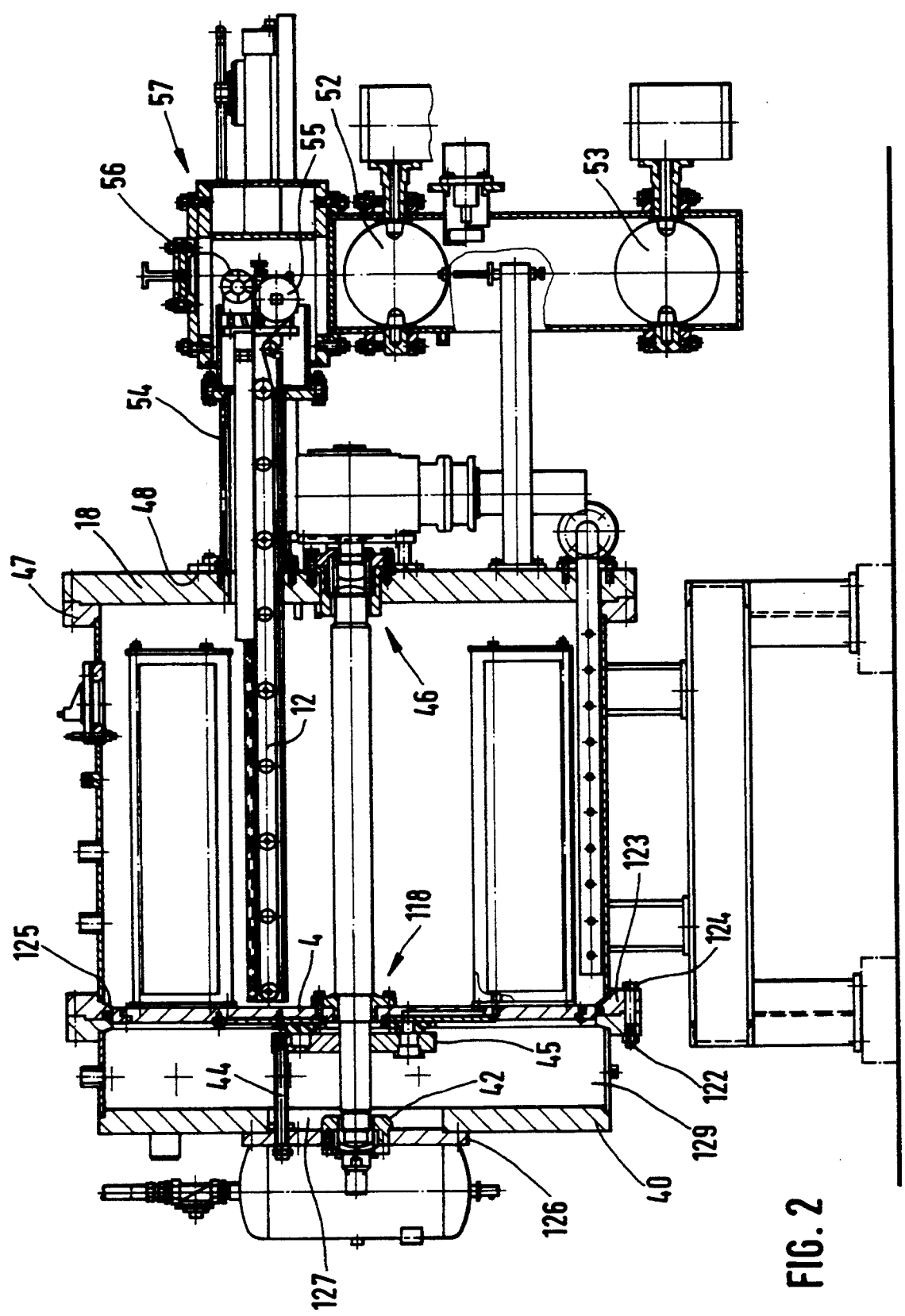

The cylindrical pressure vessel 2 has a cover 40 on its front side. This is bolted together with a flange 41 where the bolts are located on a partial circle around the shaft 3 of the turntable 4. On a further, inner partial circle sits the bolted arrangement of a concentric inner cover 2 (FIG. 2) that contains the end bearing 42 of the shaft 3 and stud 44, which hold a non-rotating control disk 45 and in which runs the shaft 3. The free end of the shaft is supported in a bearing sleeve 46 that is fastened non-rotating on the inside of the container bottom 18. This is bolted together with a flange 47 of the cylindrical pressure vessel mantle. Furthermore, the pressure vessel 18 contains openings. Opening 48 serves the removal of the filter cake from the pressure vessel 2.

Through an additional opening in the pressure vessel bottom, that is normally closed with a bolted cover 58 (FIG. 6), the nuts 49 and 50 (FIG. 7) of the studs belonging on the bottom can be loosened, and the filters pulled off from the turntable 4. Thereby a simple assembly and disassembly of the filter element is possible.

The turntable 4 is, according to the middle depiction of FIG. 5, on its circumference provided with an exchangeable bolted lock ring 120 that turns on a circular surface 121 of the cover flange 122 and the housing flange 123 of the pressure vessel. By loosening the bolted arrangement 124 of the flanged cover 40 (FIG. 2), the flanges may be loosened and thereby the lying seal 125, which is also a wearing part, made accessible.

The shaft 3 can also be accessed for repair and assembly purposes from the vessel side closed by the cover 40 and may such be mounted and removed when the cover 40 is removed. The opening 127 provided in cover 40, that can be closed with a bolted disk 121, has a large enough opening for pulling out the control disk 45 together with the cover 126, over its stud attachment 44 with the shaft bearing 46 in the disk 126.

The conveyor 12 for the removal of the filter cake is between the pressure vessel 2 and a compressed air lock 51, with the alternatingly activated closing devices 52 and 53 in a housing 54, encapsulated pressure-tight. Thereby the total of compressed air usage is reduced. The discharge drum 55, that acts together with a scraper 56, lies in a cover attachment 57 so that the blown-off components of the filter cake are directly thrown off from above into the lock 51.

The substructure consisting of the stems 58; 59 on the foundation plate 60, and the following frame 61 with the upright supports 62 and 63, is omitted in the depiction of the second form of execution according to FIG. 3; only the feet 64 and 65 that act together with the four stems 62, 63, and which carry the pressure vessel 2, are shown there. The filter elements are in two parts in this form of execution, but again twelve filters are offset each by 30°, conforming to the step-wise rotation of the disk 4, and arranged on a partial circle around the center of rotation 31 at the stop points of the circular motion.

Each filter element I to XII (FIG. 3) consists of a pair of hollow bodies 66, 67 with a generally rectangular profile, where the configuration is such that the longer rectangular sides 68, 69 are lying essentially in the radial direction to the center of rotation 31, and the shorter rectangular sides 70, 71 run tangentially to the circle of rotation. This geometry is created by a box-like construction in which the filtrate from the filtration is collected, where only the leading long sides 68, 69 of the box-like hollow bodies are covered with the filter medium 72, 73. These sides are formed by sieve plates on which the filter cloth as the filter medium lies partially hollow, so that the filtrate is able to flow through the holes in the sheet metal into the box construction. The hollow body pairs 66, 67 are interconnected with a common cross pipe socket 74 and guide the filtrate of the trailing hollow body 67 into the discharge pipe 9 that carries off the filtrate from the two hollow bodies 66 and 67.

The filtrate flows in the filter elements I–XII always in the direction of the control disk 45, through a slope of the filter elements in direction toward the outer housing cover 40 that is not visible in the drawings. The hollow body pairs 66, 67 are at the end of their slope connected with each other through the cross pipe socket 74, so that the filtrate from the hollow body 67 can run into the hollow body 66, and also its pipe socket 9 gets into the control disk.

As resulting from the depiction in FIG. 3, the respective leading hollow body 66 is sloped forward in the direction of rotation against the radial line around the center of rotation 31, while the trailing hollow body 67 follows approximately the radial line that in the filter element 1 is labeled 75. This configuration counteracts the unintentional separation of the filter cake from the emerging filter elements 9 to 11.

For the filter elements I–XII according to the form of execution in FIG. 3 a spray rinse station 128 is provided in which nozzles 76, 77 wash the filter cake with a liquid. This is intended especially for filter elements in which the filtration is aimed toward the filtrate as, e.g., in the recovery of the residual sweetness in the production of sugar, mentioned in the beginning. But also in filters for the flue gas wash, the filter cake may, e.g., be freed of the salt content through spray washing.

FIG. 4 depicts a further form of execution of the filters or filter elements I to XII. In all forms of execution are the filter surfaces arranged on the long sides 78 and 79 of filter elements forming the filters I to XII, as is also the case for the surfaces of the filter elements according to FIG. I, which are limited by the longer cross section sides 32, 33, where in this form of execution also the long sides, which are limited by the cross section sides 38, may be covered with filter cloth. In the example of execution in FIG. 4, it involves again one-piece filter elements of which one is depicted. This filter element, designated I, has on each of its long sides 78, 79 a stretch frame 80 that may with its frame members be bolted to the long walls 81, 82 of the box construction. These stretch frame members hold the four sides 81 to 84 of a filter cloth section 85, the sides 82 and 84 of which constitute cut edges at which the section was cut off a supply role, while the sides 81 and 83 constitute weave or rip length edges of the role. Between the frame members of the stretch frame 80, the filter cloth lies partly hollow due to the sieve plates 81 and 82.

Because the sides 86, 87 of the filter cross section, which run tangentially to the circular motion, are short in comparison with the longer sides 78, 79, the pressure that is exerted on these sides during filtration must be absorbed in the box construction by the cross bracing 88, 89 and a longitudinal rib 90.

The covers 91 and 92 of the box construction form the front sides, of which the cover 92 is assigned to the turntable 4. It is penetrated by a pipe socket 93, for which in the turntable 4 (FIG. 5) an opening 94 is provided, in which the pipe socket 93 becomes form-fitting with the turntable 4. Of the three stud receptacles 95 to 97, the receptacles 95 and 96 are situated in an ear shackle 98 that is bolted to the cover 92, while the third receptacle 97 is formed by a pipe 99 that penetrates the hollow body of the box construction in the longitudinal direction. One of the threaded holes 100 for the end of the thread of the studs 35 is visible in the middle sectional depiction of FIG. 5 depicting the turntable 4.

As is also visible in figures, the turntable 4 has a radial channel 101 for each filter I to XII that ends in an axial channel 102 which is formed in a cylinder liner 105 running on the inside 103 of a control disk 104. The control disk 104 possesses a ring channel 106 that runs along a partial circle of the control disk 4 and among others takes up the filtrate from the filtering filters III to XI during the filtration process. The filtrate is removed through a angle pipe socket 107 to a collection room 129 between the outside cover 40 and the pressure vessel cover 4.

However, the ring channel 106 has several closures 130 to 134 that close off the outlets 111, 114, 115, 118 and 119 against each other. As seen in the lower depiction of FIG. 5, which shows the inside 108 of the control disk 104, an additional angle pipe socket 110 terminates at 111 in the ring channel 106 that follows the partial circle 109. This angle pipe socket is located in the blow-off station and executes the air blast from the compressed air container 135 sitting outside on the cover 40, through the channel 101 and the pipe socket 93 into the respective filter elements, for the removal of the filter cake. The further angle pipe sockets 112 and 113, for which the openings 114 and 115 are provided in the control disk, allow the separate removal of the filtrate with liquid exiting from the nozzles 76, 77, while other angle pipe sockets 116 and 117 with openings 118 and 119 in the control disk are provided as reserve for other purposes, e.g., for rinse water.

What is claimed is:

1. A pressure filter comprising:

a pressure vessel having a pressure chamber and a circumferential edge;
 a turntable rotatable mounted with the pressure vessel about a horizontal axis;
 a plurality of filters non-rotatably mounted to the turntable and spaced apart from each other adjacent to the circumferential edge of the pressure vessel and rotatable with the turntable around the horizontal axis through a center of the pressure vessel such that the plurality of filters continuously dip into and out of a solids suspension in the bottom of the pressure chamber;
 a blow-off station positioned above the solids suspension in the pressure chamber for freeing filter cake that has dried on the plurality of filters;
 a filter cake conveyor for carrying the blown-off filter cake through a pressure lock in the pressure vessel;
 wherein each filter forms a filter element having a filter surface defined by cross section sides extending along a radius of the pressure vessel adjacent to the circumferential edge, and long sides extending parallel to the horizontal axis.

2. The pressure filter according to claim 1 wherein the filter elements contain a box-like hollow body which supports a stretch-mounted, flexible, partly hollow-lying filter medium.

3. The pressure filter according to claim 1 wherein the pressure vessel has a wall arranged across from the turntable and an assembly opening for the filter elements, the filter elements being fastened to the turntable with stud bolts and positioned adjacent to a pipe socket that handles the discharge of the filtrate.

4. The pressure filter according to claim 1 wherein the filter elements each contain a pair of hollow bodies connected by a common filtrate discharge and having filter surfaces, where the filter surfaces of the pairs of hollow bodies have a rectangular contour and a leading hollow body of each pair of hollow bodies is tilted forward, in the direction of rotation of the turntable, towards a radius of the turntable, while a hollow body of each pair of hollow bodies is positioned with radial main plane in the radius of the turntable.

5. The pressure filter according to claim 1 wherein a contour line of each cross-section of the filters converges in the direction of the center of rotation of the turntable wherein the contour line has converging partial sections which form an apex, wherein the filtrate removal is situated in the apex of the converging partial sections, wherein the converging partial sections of the contour lines are each connected by an arc that partially encloses the filtrate discharge, and wherein ends of the converging partial sections of the contour lines face away from the turntable and are connected with each other.

6. The pressure filter according to claim 2 further comprising a rinse station for rinsing the filter medium, located downstream of the blow-off station between adjacent filters.

7. The pressure filter according to claim 6, wherein the rinse station has a pipe lance having a discharge nozzle for the rinse medium and a drive that guides the pipe lance along the filter surface of adjacent filter elements.

8. The pressure filter according to claim 6 wherein the rinse station is used for pre-coating the filter medium.

9. The pressure filter according to claim 1 further comprising a stretch frame assigned to each of the filter elements for the stretch-mounting of a filter cloth section, wherein a pair of facing sides of the filter cloth are cut edges wherein a section of the filter cloth is separated from a filter cloth supply, while a pair of sides vertical to the facing side, are longitudinal tear edges of the filter cloth when the filter cloth is rolled-up.

10. The pressure filter according to claim 1 wherein each filter element is fastened freely projecting on a side of the turntable facing the pressure chamber, and wherein each filter element is connected through a pipe socket by a radial channel with a circular channel of a non-turning control disk from which the filtrate is discharged, where the circular channel has closures that seal inlets and outlets of the control disk for controlling compressed air and rinse liquid against each other.

11. The pressure filter according to claim 1 wherein the turntable is sealed with its circumference formed on a lock ring on a ring seal located on a circular ring seal, where the seat is accessible after removal of an outer cover flange.

12. The pressure filter according to claim 10 wherein the outer housing cover contains an opening through which the control disk can be pulled off, the control disk being connected to the cover of the opening.

13. The pressure filter according to claim 1 further comprising a spray wash positioned upstream of the blow station for spraying filter cake off the filter elements.

* * * * *

UNITED STATES PATENT AND TRADEMARK OFFICE
CERTIFICATE OF CORRECTION

PATENT NO. : 5,362,393

DATED : November 8, 1994

INVENTOR(S) : ERNST KUHME

It is certified that error appears in the above-indentified patent and that said Letters Patent is hereby corrected as shown below:

Col. 2, line 22, delete "filter is surface", insert --filter surface is--

Col. 5, line 42, delete "and"

Col. 5, line 45, delete "FIG. 4", insert --FIG.S 4A, 4B, and 4C--

Figure 5A:
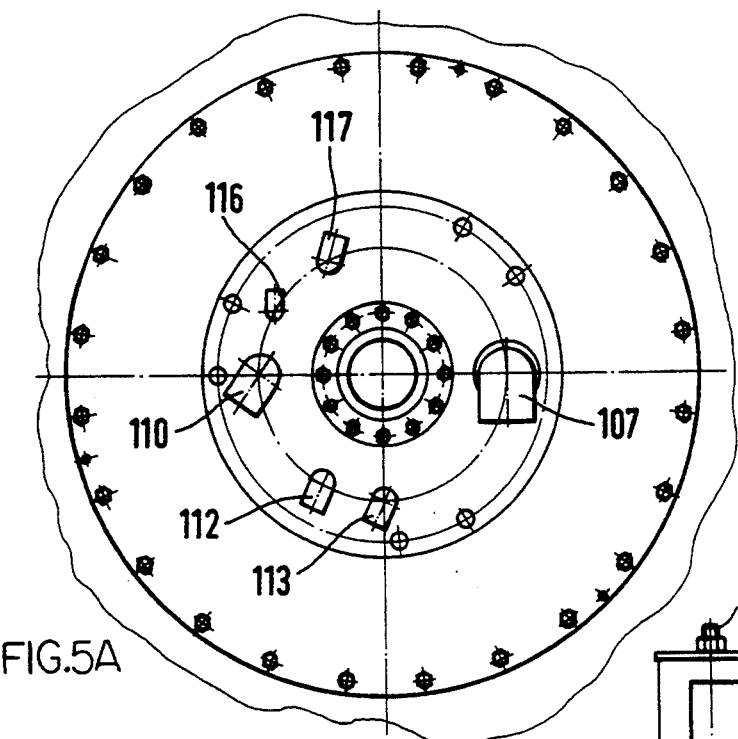
Figure 5B:
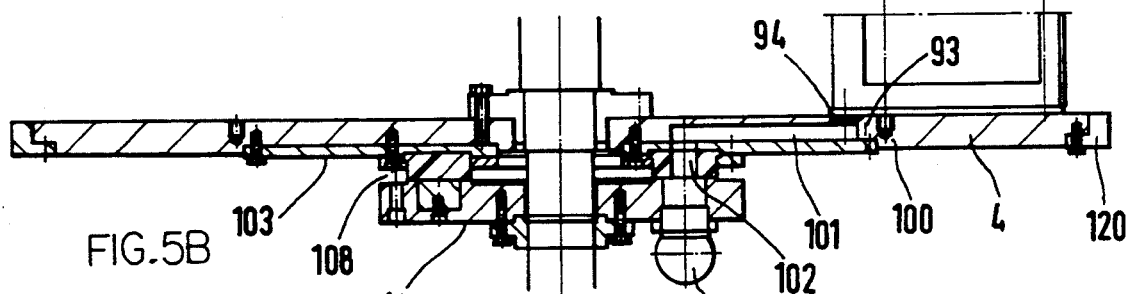
Figure 5C:
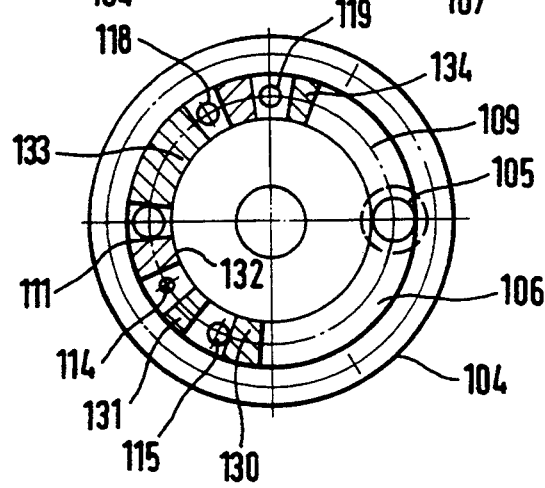

Col. 5, line 46, delete "FIG. 5", insert --FIGS. 5A, 5B, and 5C--

Col. 5, line 49, delete "FIG. 7", insert --FIGS. 7A and 7B--

Col. 6, line 19, delete "(FIG. 4)", insert --(FIGS. 4A, 4B, and 4C)--

Col. 6, lines 40-41, delete "elements subjected to a high-pressure wash are during", insert --elements are subjected to a high-pressure wash during--

Col. 7, line 49, delete "(FIG. 7)", insert --(FIGS. 7A and 7B)--

Col. 7, lines 53-54, delete "the middle depiction of FIG. 5", insert --FIG. 5B--

Col. 8, line 66, delete "FIG. 4 depicts", insert --FIGS. 4A, 4B, and 4C depict--

Col. 9, line 3, delete "FIG. I", insert --FIG. 1"--

Col. 9, line 7, delete "FIG. 4", insert -- FIGS. 4A, 4B, and 4C--

Col. 9, line 28, delete "(FIG. 5), insert --(FIGS. 5A, 5B, and 5C".--

UNITED STATES PATENT AND TRADEMARK OFFICE
CERTIFICATE OF CORRECTION

PATENT NO. : 5,362,393
DATED : November 8, 1994
INVENTOR(S) : ERNST KUHME

It is certified that error appears in the above-indentified patent and that said Letters Patent is hereby corrected as shown below:

Col. 9, lines 36-37, delete "the middle sectional depiction of FIG. 5", insert --FIG. 5B--

Signed and Sealed this

Eighteenth Day of April, 1995

BRUCE LEHMAN

*Attest:*

*Attesting Officer*    Commissioner of Patents and Trademarks